United States Patent [19]

Fredericks et al.

[11] Patent Number: 5,164,734
[45] Date of Patent: Nov. 17, 1992

[54] RADAR TARGET WITH DELAYED REPLY MEANS

[75] Inventors: Duane G. Fredericks, 63 Woodbury Dr., Lockport; Herbert W. Rosebrock, 1310 Forbes St., N. Tonawanda, both of N.Y.

[73] Assignee: Duane G. Fredericks, Lockport, N.Y.

[21] Appl. No.: 774,040

[22] Filed: Oct. 7, 1991

[51] Int. Cl.⁵ .............................................. G01S 7/40
[52] U.S. Cl. ...................................... 342/172; 342/187
[58] Field of Search .................. 342/42, 51, 165, 171, 342/172, 187

[56] References Cited

U.S. PATENT DOCUMENTS 3,018,478  1/1962  Skillman et al. ................. 342/171
3,128,462  4/1964  Woolfson ......................... 342/172
4,083,004  4/1978  Cohn ............................ 342/186 X
4,218,680  8/1980  Kennedy .......................... 342/51
4,613,863  9/1986  Mitchell ........................ 342/172

*Primary Examiner*—T. H. Tubbesing
*Attorney, Agent, or Firm*—Howard J. Greenwald

[57] ABSTRACT

An active radar target device is disclosed. This device contains a means receiving a radar signal, a means for decreasing the frequency of the radar signal received, at least one means for delaying the reduced frequency radar signal, means for increasing the frequency of the delayed signal, and means of modulating the delayed signal. The modulated and delayed signal is transmitted to an antenna, from which it may be radiated to a radar detector.

4 Claims, 5 Drawing Sheets

INBOUND/OUTBOUND DOPPLER MOD.

(112) RADAR BI-PHASE MOD.

RADAR TARGET WITH DELAYED REPLY MEANS

FIELD OF THE INVENTION

An active radar target which provides a delayed radar return signal which is substantially free of spurious information.

BACKGROUND OF THE INVENTION

A radar antenna is generally constructed so that its mechanical axis of symmetry is coincident with its electrical axis. In such an antenna, the radio frequency beam will then be substantially centered on the mechanical axis.

High gain and narrow beamwidth radar antennas often exhibit a "squint" situation in which the radio frequency beam being returned by the antenna will deviate slightly from the mechanical axis of the antenna. This "squint" often causes a problem when such an antenna is used in a high performance radar system and an attempt is made to calibrate a radar source with such target.

High gain point targets are often used to calibrate radar sources; these point targets frequently contain a corner reflector which is comprised of three reflecting plates oriented 90 degrees from each other.

However, the use of such high gain point targets often does not provide satisfactory calibration results. The corner reflectors in such point targets cannot exclude extraneous return signals within the radar antenna beamwidth at the same range as the corner reflector.

The corner reflectors must be placed on a high tower to keep the radar beam above the ground in order to minimize "skin return" and/or "clutter return" reflected from the ground. Sometimes the return from the tower and the ground will be significantly large, and the radar antenna will try to walk up and down the tower in elevation when fully locked onto by the radar. Furthermore, clutter also often is developed from objects nearby the target (such as buildings, trees, etc.) which can sum with the return from the corner reflector and can also corrupt the point target. This clutter then causes a "noisy" return and, when an attempt is made to align the radar source, tends to reduce the accuracy of the alignment.

It is an object of this invention to provide a radar target which provides a delayed return signal which is substantially free of spurious information, such as ground clutter.

It is another object of this invention to provide a radar target which provides a delayed return signal which can simulate objects at different distances than the target.

It is another object of this invention to provide a radar target which provides a delayed return wherein such delayed return can be made to appear to approach or recede incrementally at a rate coinciding with the Doppler frequency (velocity) imparted to the radar carrier frequency.

It is another object of this invention to provide a radar target adapted to return a signal to the radar transmitter which has substantially different characteristics than the signal received by the radar target.

It is another object of this invention to provide process for using the radar target of this invention so that the delayed radar signal returned to the radar source will contain virtually no clutter.

It is another object of this invention to provide a radar target system comprised of several targets above the radar horizon which is adapted to simulate multiple approaching threat aircraft at low altitude for use in training radar operators and for evaluating tactical battlefield radars.

It is another object of this invention to provide a process using two radar targets located at the ends of a runway to provide a runway centerline marker on the airport surveillance radar display.

It is another object of this invention to provide an "IFF" (identification friend or foe) radar target device to identify friendly vehicles or troops, wherein the target provides a coded (delayed) pulse group for identification.

SUMMARY OF THE INVENTION

In accordance with this invention, there is provided an active radar target device. This device contains a means for decreasing the frequency of the radar signal received, at least one means for delaying the reduced frequency radar signal, means for increasing the frequency of the delayed signal so that it has substantially the same frequency as the incoming radar signal, and means of modulating the delayed signal. The modulated and delayed signal is transmitted to an antenna, from which it will be radiated back to the radar system. In several embodiments of the invention, a simple data link is used to select and control the parameters of the target device.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
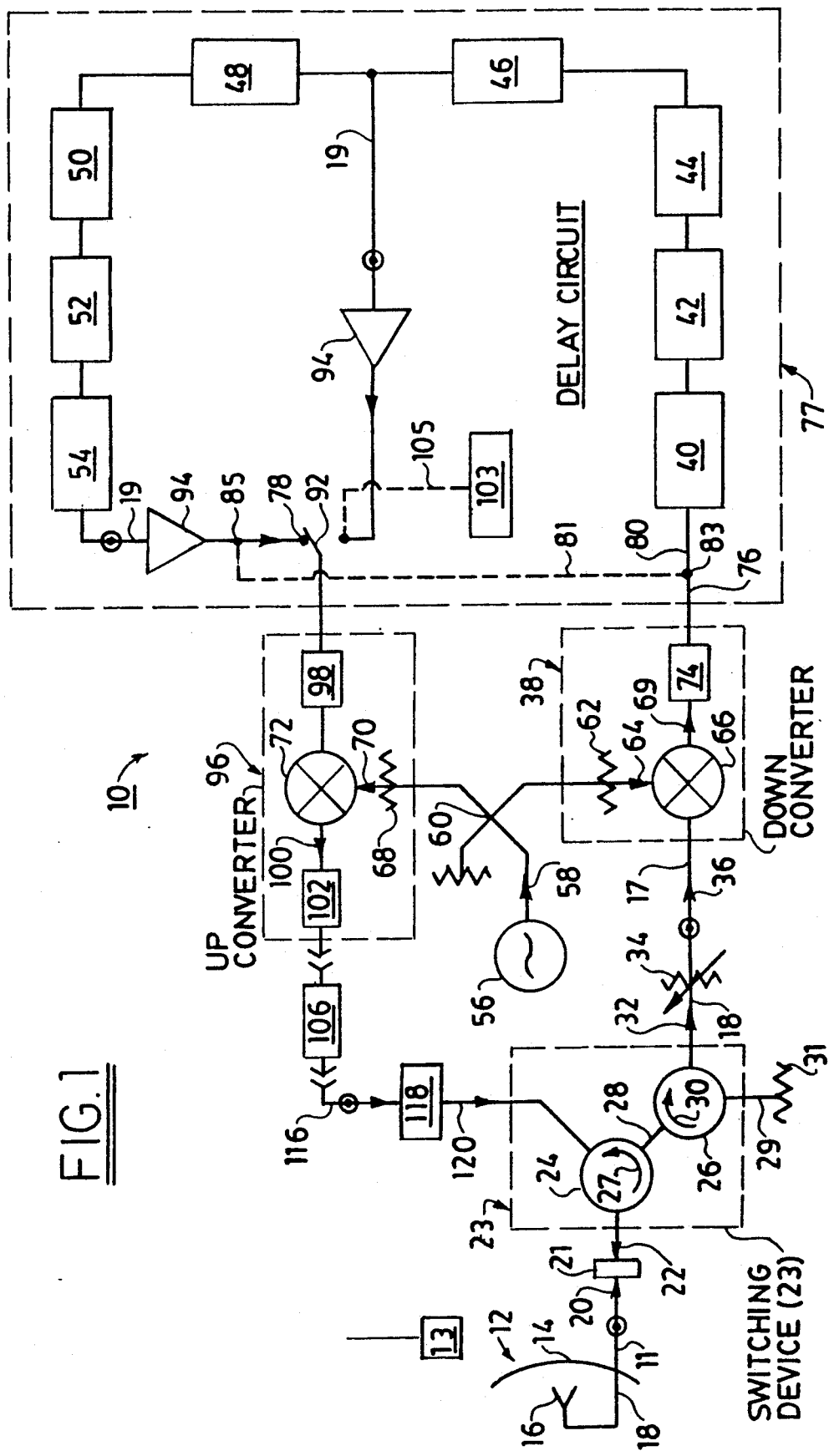
FIG. 1 is a block diagram of one preferred embodiment of the radar target device of the invention.

FIG. 1 is a block diagram of one preferred embodiment of the novel radar target of this invention. This block diagram illustrates a device which produces a delayed and modulated reply signal in response to an incoming radar signal.

Referring to FIG. 1, it will be seen that radar target 10 may be electrically connected to a means for receiving a radar signal, such as antenna 12.

In the preferred embodiment illustrated in FIG. 1, radar target 10 is also operatively connected to data link 13. As is known to those skilled in the art, a data link is a data transmitter means which allows one to transmit data or information to an apparatus. Thus, by way of illustration and not limitation, the data link 13 may be a communications cable, a fiber optics cable, a radio linkage, a mechanical linkage, a hydraulic linkage, and the like.

In one preferred embodiment, illustrated in FIG. 1, antenna 12 is comprised of reflector 14, antenna feed 16, and transmission line 18.

In one embodiment, antenna 12 is a microwave antenna. As is known to those skilled in the art, a microwave antenna is often comprised of a waveguide feed assembly and a parabolic reflector. Alternatively, or additionally, a horn antenna may be used.

The transmission line 18 is preferably a coaxial cable, although other types of transmission lines also may be used. Thus, for example, one may use a waveguide.

When the incoming radar signal has a frequency of from about 20 to about 95 Gigahertz, it is preferred to use a waveguide as the transmission line. When the incoming radar signal's frequency is from about 1 to about 20 Gigahertz, it is preferred to use coaxial cable as the transmission line.

In one embodiment, the signal from antenna 12 is fed via a coaxial cable 18 to the radar target 10. As used in this specification, the term coaxial cable refers to a transmission line in which one conductor is centered inside of and insulated from an outer metal tube that serves as the second conductor. See, for example, page 26–45 of the Donald G. Fink et al.'s "Standard Handbook for Electrical Engineers," Eleventh Edition (McGraw-Hill Book Company, New York, 1978).

Substantially any coaxial cable suitable for use at the frequency of the radar signal may be used as cable 18. By way of illustration and not limitation, one may use a semirigid coaxial cable containing an outer copper tube, a Teflon dielectric, and an inner conductor which can be copper clad; such a cable is commercially available from, e.g., Micro-Coax Components, Inc., Collegeville, Pa. 19416. By way of further illustration, a comparable flexible coaxial cable also may be used.

In the embodiment illustrated in FIG. 1, several signals can simultaneously be transmitted through coaxial cable 18. Thus, a signal may pass in the direction of arrow 20 while another signal may simultaneously pass in the direction of arrow 22.

In one preferred embodiment, illustrated in FIG. 1, the signal passing in the direction of arrow 22 is first passed through a band pass filter 21 prior to the time it is fed to a switching device 23. The function of band pass filter 21 is to exclude all radar signals with frequencies outside of the band of frequencies being transmitted from the radar source. Thus, for example, when a radar source is transmitting radar within the X band (which has a range of frequencies of from about 8.5 to about 9.6 Gigahertz), band pass filter 21 will only pass frequencies within the range of from about 8.5 to about 9.6 Gigahertz; all other frequencies will be substantially attenuated or rejected.

Any suitable band pass filter 21 which has the desired filtering characteristics may be used.

The signal passing through band pass filter 21 is then fed to switching device 23. The switching device 23 permits the use of the same antenna for both transmitting and receiving. This type of switching device is often referred to as a "duplexer," or a "duplexing assembly," or a "circulator," and it is well known to those skilled in the art. See, for example, page 23 of Gershon J. Wheeler's "Radar Fundamentals" (Prentice Hall, Inc., Englewood Cliffs, N.J., 1967).

In one embodiment, the switching device 23 can be a high speed switch which connects the antenna to the transmitter during the pulse emission or transmission time and/or to the receiver during the inter-pulse intervals.

In one embodiment, it is preferred to use a switching device 23 which allows the transmitter and the receiver to operate continuously with one antenna. In one aspect of this embodiment, it is preferred to use a circulator (such as a ferrite circulator) as the switching device 23.

Circulators are well known to those skilled in the art. See, for example, U.S. Pat. No. 4,679,049 of Rifflod, the disclosure of which is hereby incorporated by reference into this specification. Thus, e.g., one may use the ferrite circulator disclosed in U.S. Pat. No. 3,955,198 of Delzer, the disclosure of which also is incorporated by reference into this specification.

Any of the circulators known to those skilled in the art may be used in applicant's radar target. Thus, by way of illustration and not limitation, one may use a two-section junction circulator with 3 millimeter coaxial connector. These type of circulators are commercially available over the range of from about 0.1 to about 26.5 Gigahertz and may be obtained from, e.g., UTE Microwave Inc., 3500 Sunset Avenue, Asbury Park, N.J. 07712 (see, e.g., catalog F/87 entitled "Ferrite Devices.Filters").

By way of further illustration, ferrite junction circulators are also described in a publication entitled "Ferrite Devices Specification Handbook," which is published by Western Microwave Company of 1271 Reamwood Avenue, Sunnyvale, Calif. These circulators are comprised of a ferrite substrate which is either contiguous with or in the vicinity of a magnet; in one embodiment, the magnet is adhesively joined to the ferrite substrate by epoxy adhesive. The magnet and the ferrite substrate are disposed within a cavity and are electrically connected to three ports. The ferrite substrate is adapted to accept a signal from one port and to direct it to another port. Depending upon how the substrate is magnetically biased, it will direct the energy to one of the two output ports.

In the preferred embodiment illustrated in FIG. 1, a two-pass duplexer is used. This two-pass duplexer is comprised of circulator 24 and circulator 26. In this embodiment, circulator 26 also acts as an isolator, preventing the transmission of reflected signals from the components downstream from it. Such reflected energy is passed from circulator 26 via line 20 to load 31, where it is terminated.

Electromagnetic energy from antenna 10 is preferably passed via coaxial cable 18 in the direction of arrow 20 to circulator 24, through which it is passed in the direction of arrow 27. The energy then passes from circulator 24 through line 28 to circulator 26, through which it is passed in the direction of arrow 30. Thereafter, energy passing from circulator 26 is then passed in the direction of arrow 32 to variable attenuator 34.

Because it is sometimes desirable to decrease the signal level of the signal being passed from the circulator, a variable attenuator 34 may be used, as is illustrated in FIG. 1; this variable attenuator operates in a manner similar to a potentiometer. One may use any of the variable attenuators known to those skilled in the art. Thus, by way of illustration, one may use a variable radio frequency attenuator such as those sold by ARRA Inc. of 15 Harold Court, Bay Shore, N.Y.; see ARRA Inc. catalog number 90, published in 1987.

The radar signal passing through variable attenuator 34 generally has a frequency of from about 1 to about 95 Gigahertz. This radar signal is passed in the direction of arrow 36 to down converter 38 via coaxial cable 17.

As is known to those skilled in the art, the incoming radar signal is generally comprised of a radar pulse with an effective bandwidth and a center frequency substantially in the middle of the band. The response curves of radar components are often bandwidth limited and frequently are described with a center frequency and an operating band disposed around it. In these response curves, the center frequency is often referred to as $f_o$"; see, e.g., page 65 of Frederick E. Terman's "Radio Engineering" (McGraw-Hill Book Company, New York, 1947).

The center frequency of a radar pulse may be measured by conventional means. Thus, by way of illustration and not limitation, one may use a "Spectrum Analyzer" sold by the Hewlett-Packard Company of 1400 Fountain Grove Parkway, Santa Rosa, Calif. The center frequency of a radar pulse may be determined by conventional means in accordance with the procedure described in a publication identified as "Hewlett-Packard Part No. 00853-90010" and entitled "ECONOMY SPECTRUM ANALYZER OPERATION" (printed in August, 1982). The display of this spectrum analyzer has a center line, marked "center," which identifies the center frequency of the pulse being analyzed.

Down converter 38 provides means for decreasing the frequency of the input signal by at least about 65 percent. The percent decrease may be calculated by subtracting the decreased frequency from the original frequency and dividing this difference by the original frequency.

By way of illustration, when an "S" band radar is used as the input signal, the center frequency of the signal may be decreased by the use of down converter 38 from an input center frequency of 3,000 megacycles to an output center frequency of 700 megacycles. In this embodiment, the percent decrease is about 76.7 percent.

By way of further illustration, when X band radar is used as the input radar signal, its center frequency may be reduced by the use of down converter 38 from about 10,000 megacycles to about 700 megacycles. In this embodiment, the percent decrease is about 93 percent.

By way of further illustration, in one embodiment the center frequency of the incoming radar signal is preferably reduced from about 35,000 megacycles to about 700 megacycles. In this embodiment, the percent decrease is about 98 percent.

The use of down converter 38 provides several distinct advantages. In the first place, it allows one to use one or more delay modules (such as, e.g., delay modules 40, 42, 44, 46, 48, 50, 52, and 54) which are designed to operate at lower frequencies and which are commonly substantially less expensive than delay modules designed to operate at higher frequencies. In the second place, less expensive amplifiers may be used in the delay module circuit. In the third place, the use of the lower frequency generates less noise in the system. In the fourth place, the delay modules designed for use at lower frequencies are substantially more stable than those adapted for use at higher frequencies, especially when there are wide variations in temperature, and they thus give more reliable and accurate calibration results.

Any of the means known for decreasing the center frequency of the radar signal may be used in applicant's device. It is preferred, however, to utilize a heterodyne device comprised of a mixer and a local oscillator. This system will develop two signals (sum and difference), one of which can be allowed to pass through to the next stage in the system.

Referring again to FIG. 1, and in the preferred embodiment described therein, the down converter 38 is preferably comprised of an oscillator 56 which feeds a signal in the direction of arrow 58 to divider 60. Half of this signal is preferably fed to matching resistive pad 62 and thence in the direction of arrow 64 to mixer 66, and the other half of this signal is preferably fed to matching resistive pad 68 in the direction of arrow 70 to mixer 72.

Oscillator 56 is preferably a dielectric resonant oscillator. As is known to those skilled in the art, a dielectric resonant oscillator is a stable microwave generator using a dielectric material as the resonator in a microwave oscillator circuit. A solid state amplifier (i.e., a field effect transistor ["FET"]) is used with feedback from the resonator to provide a stable frequency local oscillator signal for the down converter.

One may use any of the dielectric resonant oscillators known to those skilled in the art. Thus, by way of illustration and not limitation, one may use any one of the "DIELECTRIC RESONATOR OSCILLATOR 'E' SERIES" which use low phase noise bipolar transistors in the 3–6 Gigahertz frequency range. These oscillators are described in catalog D-93, entitled "DIELECTRIC RESONATOR OSCILLATORS" (published by the MITEQ Company of 100 Davids Drive, Hauppauge, N.Y.

Referring again to FIG. 1, it is preferred that mixer 66 and/or mixer 72 be a double balanced mixer. As is known to those skilled in the art, a mixer is a device that sums two input signals and produces an output containing the sum of the two input frequencies as well as the difference between the two input frequencies. A double balanced mixer contains a diode bridge and the appropriate matching and splitting components to provide the sum and difference signals efficiently while suppressing each of the two input signals (the radar carrier and the local oscillator signals).

These double balanced mixers are well known to those skilled in the art and are described, e.g., on pages 3.10-3.11 of Merril Sloknik's "Radar Handbook," Second Edition (McGraw-Hill Publishing Company, New York, 1990. They are commercially available from, e.g., Western Microwave, 1271 Reamwood Avenue, Sunnyvale, Calif. and are described in a 1987 Western Microwave catalog entitled "1987 Microwave Components Specification Handbook" (see pages 51 et seq.).

The output from double-balanced mixer 66 is passed in the direction of arrow 69 to filter 74. This output generally contains at least two separate frequency components. The first such frequency component represents the sum of the frequencies from variable attenuator 34 and resistive pad 62; and the second such frequency component represents the difference between the frequencies from variable attenuator 34 and resistive pad 62.

Filter 74 is a low-pass filter adapted to allow the low frequency signal to pass through it and to block the passage of the higher frequency signal. The output from low pass filter 74 is passed in the direction of arrow 76 to the delay circuit 77.

Any suitable low-pass filter may be used as filter 74. Thus, by way of illustration and not limitation, one may use a tubular low pass filter such as those described on pages 60 et seq. of catalog GC88-10M, "Microwave and RF Component Catalog," K & L Microwave Incorporated, 408 Cole Circle, Salisbury, Md.

In one embodiment, the center frequency of the output from the down converter 38, which passes through the low-pass filter 74, is from about 100 to about 1,300 megacycles and, preferably, from about 700 to about 1,300 megacycles; and it is passed through a delay circuit 77.

The delay circuit 77 used in target 10 provides a means for decreasing the velocity of the signal fed via transmission line 76. When said signal is within the delay circuit, it has a velocity of propagation which is no greater than about 0.1 percent of its velocity when it entered the delay circuit at point 80. Consequently, there is a substantial time delay between the time of arrival of the signal (at point 80) and its time of return (at point 78).

The extent to which a delay means can delay the signal incoming at point 80 may be measured by a test in which a test line 81 is connected between points 83 and 85, and the time it takes the signal to travel from point 83 to point 85 is determined. Inasmuch as the radar signal travels at the speed of light, this time will usually be substantially zero seconds. Thereafter, test line 81 is removed, and the time it then takes the radar signal to travel from point 83 through the delay means 77 is then determined. The difference between the two times is the delay time.

In general, the minimum time delay required by the radar is at least several radar transmitted pulse widths (based upon the pulse width of the incoming radar signal) and, more preferably, at least such three pulse widths; and the time delay is usually at least about 1 microsecond and, preferably, at least about 3 microseconds. In a more preferred embodiment, the delay is from about 5 to about 100 microseconds. The use of these delay means allows one to produce a radar return signal which is substantially free of clutter. As used in this specification, the term "substantially free of clutter" refers to a signal which, when displayed on the display of the radar receiver, exhibits no impression except that of the desired signal. As will be apparent to those skilled in the art, with such a clutter-free signal, when the radar servo system is locked up and on automatic, there is no movement of the antenna pedestal and range tracker, as observed on the azimuth, elevation, and range display readouts.

Any of the delay means known to those skilled in the art may be used in the delay circuit. Thus, for example, one may use the bulk acoustic wave delay lines or the surface wave acoustic wave delay lines sold by Sawtek Inc. of Orlando, Fla. Thus, for example, one may use the delay circuit disclosed in U.S. Pat. No. 4,679,049 of Rifflod; the Rifflod patent contains an excellent discussion of the principles of delay circuits.

The delay line may be a non-dispersive delay line, with a constant delay property over its operating bandwith. As is known to those skilled in the art, a dispersive medium is one in which the phase velocity is a function of the frequency. In a non-dispersive delay line, the phase velocity of the signal is independent of the frequency. See, e.g., pages 538–539 of John D. Kraus' "Electromagnetics," Fourth Edition (McGraw-Hill, Inc., New York, 1982).

In one embodiment, a hermetically sealed non-dispersive delay line is used. As is known to those skilled in the art, this is a device that will provide a constant delay frequency. These devices are usually fabricated as either a "bulk" acoustic device or a "surface" wave acoustic device with a transducer at the input and the output (transmission type). These delay lines are designed with a center frequency of operation and with an operating bandwidth.

The acoustic delay line provides a means of delaying the radar transmitted signals more efficiently than prior methods, such as, e.g., coils of waveguide. In these newer devices, the conversion of the incoming electromagnetic wave to an ultrasonic wave is accomplished with the input transducer of the delay line.

The medium used in the delay line affects the velocity of the radar signal. Quartz is commonly used as a medium in bulk acoustic lines. Sapphire is commonly used as a medium in surface acoustic lines.

By way of illustration, the velocity of propagation of a sheer wave in fused quartz is only 3764 meters per second. By comparison, the velocity of propagation of said sheer wave in free space is 300,000,000 meters per second.

By way of illustration, a suitable non-dispersive delay line which may be used is sold by Crystal Technology Company of 1060 East Meadow Circle, Palo Alto, Calif. as SAW non-dispersive delay lines. In one aspect of this embodiment, these delay lines have a minimum center frequency of 100 megahertz, a maximum center frequency of 1,300 megahertz, a minimum bandwidth (3 decibels) of 0.5 megahertz, a maximum bandwidth (3 decibels) of 500 megahertz, a minimum delay of 80 nanoseconds, a maximum delay of 18 microseconds, and an insertion loss (unmatched) of from about 15 to about 30 decibels.

One may use only one delay module in the system. Alternatively, one may use several of such delay modules. Thus, in the embodiment illustrated in FIG. 1, a multiplicity of delay means 40, 42, 44, 46, 48, 50, 52, and 54 is used; each of these delay means is comprised of a delay module.

Figure 2:
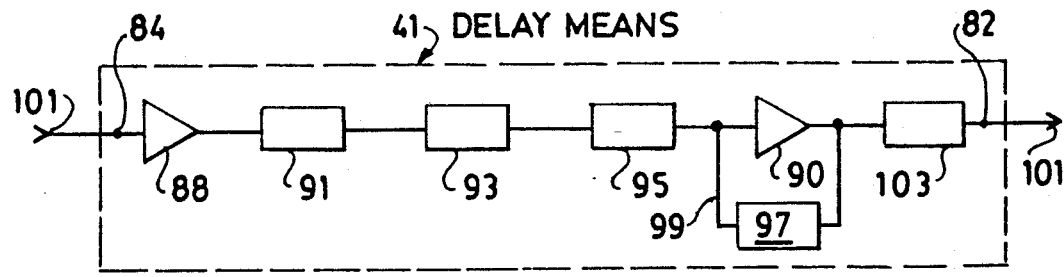
FIG. 2 is a block diagram of a preferred embodiment of a delay module used in the device of FIG. 1.

A typical delay means 41 which may be used in the claimed device is illustrated in FIG. 2. This delay means 41 preferably has substantially a unity gain; i.e., the amplitude of the signal at output point 82 is approximately equal to the input at point 84, plus or minus about 1.0 decibel. Thus, as is used in this specification, the term "approximately equal" refers to an output amplitude which is from about 79 to about 125 percent of the input amplitude.

Thus the delay means 41 et seq. preferably delay the signal without substantially attenuating it. This is advantageous because it allows one to use a multiplicity of delay means in series.

The delay means 41 is preferably comprised of amplifiers 88 and 90, filter 91, resistive matching network 93, delay line 95, feedback network 97, feedback line 99, and SMA coaxial input and output connectors cable 101. The output of this delay module 41 is preferably such that it has substantially the same amplitude as the input, plus or minus about 1.0 decibel. As will be apparent to those skilled in the art, one may adjust the gain of the amplifier stage(s).

Other conventional delay means also may be used. Thus, for example, one may use one or more of the delay circuits described in U.S. Pat. Nos. 4,168,502 of Susie, 4,319,247 of Warren, 3,701,153 of Gagliardi et al., and the like. The disclosure of each of these United States patents is hereby incorporated by reference into this specification.

In one preferred embodiment, the delay circuit is comprised of a means for controlling the number of delay modules the signal must pass through and, thus, the extent to which the signal is delayed. One such means 103 is illustrated in FIG. 1, and it is electrically connected to relay 92 by line 105. When relay 92 is open, the signal passes thorough all of the delay modules. When relay 92 is closed, however, the signal only passes through delay means 40, 42, 44, and 46. Other means for varying the number of delay modules which are active in the circuit also may be used. Thus, for example, one may use a switch (not shown) connected to multiple taps (not shown) located at various parts of the delay circuit.

It will be apparent that other switching means may be used in place of relay 92. Thus, for example, one may use pin diode switching.

Switching means 103 may be adapted to automatically sequence the number of delay means through which the signal has to travel to develop an approaching or departing signal.

In one embodiment, (not shown) the delay means used is comprised of a multiplicity of taps and associated amplifiers 94, which allows one to determine the amount of delay desired for the best clutter rejection characteristics. Thus, in addition to having multiple taps utilizing different delay means, one may also utilize multiple taps on the same delay means.

As will be apparent to those skilled in the art, the number of delay means used, and the type of delay modules used in them, will dictate how long a delay is imposed by the circuit. It is preferred, however, that each of the delay means have a substantially unity gain, plus or minus about 1.0 decibel.

Referring again to FIG. 1, the signal passing from delay means 54 (and/or delay means 46, in the case where the relay 92 is closed) through coaxial cable 19 is passed through amplifier 94. The function of amplifier 94 is to adjust the level of the output signal so that it substantially the same amplitude as the input signal, plus or minus one decibel.

The output from amplifier 94 is then passed through filter 98 in an up converter circuit 96. The function of this up converter circuit is to increase the frequency of the signal so that it is equal or substantially equal to the frequency of the signal entering the down converter 38. As used in this specification, the term "substantially equal" refers to a output frequency from the up converter 96 which is within plus or minus 5,000 cycles of the frequency fed to the down converter 38 (which also is equal to the frequency of the incoming radar signal).

The up converter circuit 96 may be similar to or different than the down converter circuit. The advantage of the circuits illustrated in FIG. 1 is that they utilize one of the same circuit components (the oscillator 56).

Referring to FIG. 1, it will be seen that the up converter circuit 96 is preferably comprised of band pass filter 98, which screens out noise present in the signal. Thereafter, the signal is passed to mixer 72, which also receives a signal from dielectric resonant oscillator 56. Mixer 72 may be similar to, or different than, the mixer 66 used in the down-converter circuit 38.

The output from mixer 72 is passed in the direction of arrow 100 to high pass filter 102, which only allows the passage of the higher of the two signals fed from the mixer 72. One may use any of the high-pass filters known to those skilled in the art. Thus, by way of illustration and not limitation, one may use any of the high pass filters disclosed on pages 72 et seq. of the aforementioned catalog GC88-10M of K&L Microwave Incorporated, Salisbury, Md.

The signal passing through high-pass filter 102 is then fed to modulator 106. The modulation of this signal is described in another section of this specification.

Simplified block diagram of applicant's device

Figure 3:
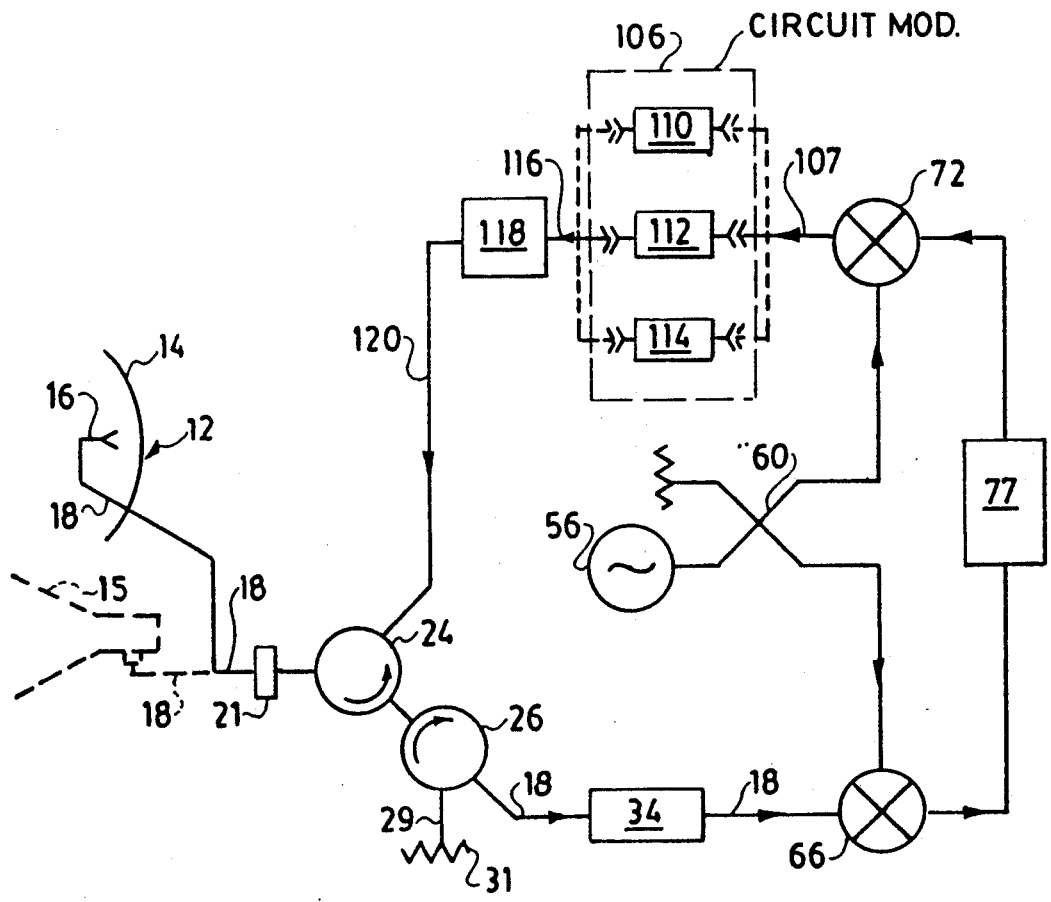
FIG. 3 is a simplified block diagram of the radar target device of this invention.

FIG. 3 is a simplified block diagram of the system similar to that depicted in FIG. 1. In the system of FIG. 3, a signal is received by parabolic antenna or, optionally, by horn antenna 13 and fed to circulators 24 and 26. The signal fed from circulator 26 is then passed through variable attenuator 34, which acts as a means for insuring that the components downstream of component 34 are not damaged by too intense a signal. Thereafter, the frequency of the signal passing from attenuator 34 is decreased by at least about 65 percent in down converter 66. The decreased frequency signal is then delayed at least about 1 microsecond by delay circuit 77. The signal thus delayed is then passed to an up conveyer circuit comprised of mixer 72, in which the frequency of the signal is increased so that it is substantially equal (plus or minus 5 kilocycles) to the frequency of the incoming radar signal. Thereafter, the signal is then passed to one or more of modulating means 110, 112, or 114.

The signal may be modulated in modulator 114, in which a Doppler velocity is added or subtracted from the carrier. Alternatively the signal may be modified in device 112, in which the incoming pulse repetition frequency is generally divided by 2 and the carrier is bi-phase modulated by a 180 degrees on alternate received PRF pulses. Alternatively, or additionally, the signal may be have a single or double sideband suppressed carrier impressed upon it in modulator 110. Each of these modulating means will be discussed in detail in a subsequent section of this specification.

The signal passing from one or more of modulators 110, 112, and 114 is then passed via line 116 to radio-frequency amplifier/programmable attenuator 118. This device has the capability of amplifying or attenuating the signal. When it is desired to increase the radar cross-section of the signal, it may be amplified in component 118. Conversely, when it is desired to make it appear that the radar target is further away, one may attenuate the signal.

The signal from amplifier/attenuator 118 is then passed via line 120 to circulator 24, by which it is directed to antenna 12 or antenna 13 for transmission.

A simple discrete data link 13 may be used to select and control the functions of the delayed radar target.

Modulation of the delayed signal

The signal passing through high-pass filter 102 is passed in the direction of arrow 107 to modulator 106. In modulator 106, certain characteristics of the signal wave are varied or selected.

Thus, by way of illustration (see FIG. 3), modulator 106 may be a Bi-phase modulator 112, a Doppler frequency modulator 114, a suppressed carrier double sideband modulator 110, and the like.

Frequency modulation with production of sideband(s)

In one embodiment, the signal passed into modulator 110 is modified so that the sidebands above and below the frequency of the signal are generated; these suppressed carrier double sideband(s) are then returned to the radar source.

In this embodiment, the signal is preferably modulated by a stable crystal oscillator to generate both sidebands (above and/or below the carrier). The radar received local oscillator may be tuned either above or below the radar transmitter to allow one of the sidebands to pass through the intermediate frequency amplifier, and it is then processed by the receiver. This technique excludes substantially all of the radar clutter.

The modulator used in this embodiment is well known to those skilled in the art. It has been used for many years in a device identified as "'X' Band Radar Calibration Target, Racor Model 8600-003-1," which is sold by the Fredwal Inc. of 2211 Main Street in Buffalo, N.Y. The device is described in a publication made in August, 1988 and entitled "Operations and Maintenance Manual for 'X' Band Calibration Target . . . " which was published by Fredwal Inc. of 2211 Main Street, Buffalo, N.Y.

Figure 4:
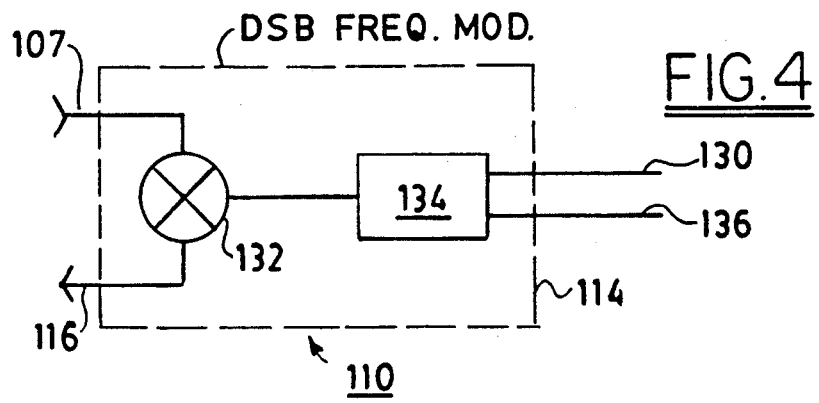
FIG. 4 is a block diagram of a frequency modulator device which will produce either double sideband or single sideband suppressed carrier energy and which may be used as a modulator in the device of FIG. 1.

FIG. 4 is a simplified block diagram of one preferred embodiment of modulator 106, and it is comparable to the block diagram appearing on page 6 of such "Operations and Maintenance Manual . . . " Referring to FIG. 4, it will be seen that, in this embodiment 110, the modulator is comprised of connector 130, mixer 132, and crystal oscillator 134, and output connector 136. In the operation of this device, the oscillator 134 is tuned to a fixed frequency. When the signal from oscillator 134 is mixed with the signal from up converter 96 (not shown) via line 107, a double sideband suppressed carrier signal is generated. The output from mixer 132 is fed in the direction of arrow line 116 to amplifier/attenuator 118 (see FIG. 3).

In one embodiment, not shown, the mixer 132 is replaced by a image rejection mixer in order to generate a single sideband suppressed carrier modulation.

Doppler Modulator

In another embodiment of the invention, the modulator 106 is a Doppler modulator. In this embodiment, the target 10 may be used to calibrate pulse Doppler radar signals.

As is known to those in the art, when a target is moving toward or away from a transmitter, the frequency of the returned echo is shifted from the original frequency by an amount dependent on the radial velocity of the target and the frequency of the radar. The change in frequency is called the Doppler frequency.

Figure 5:
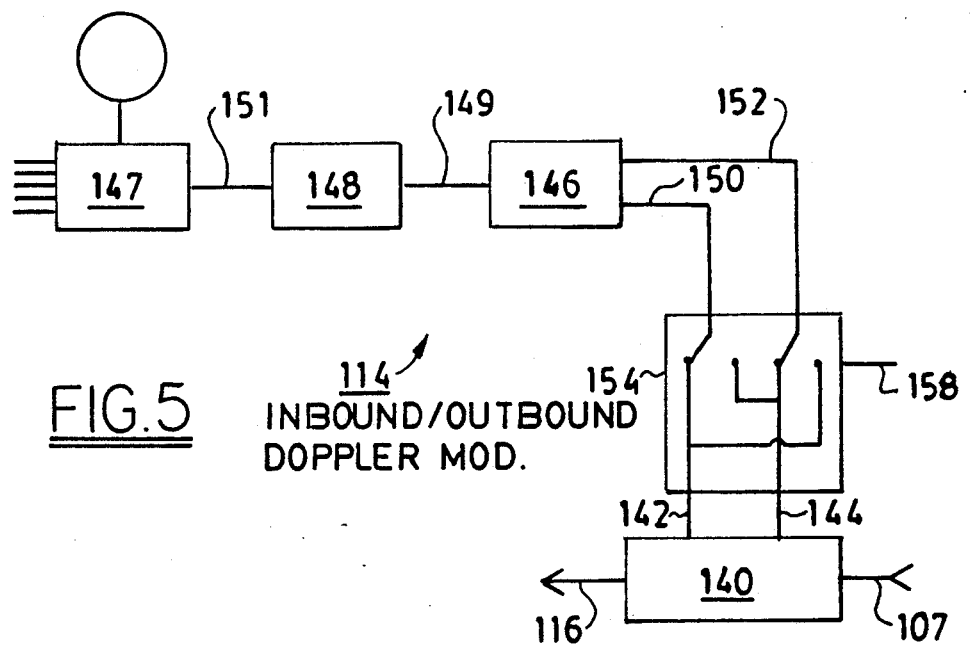
FIG. 5 is a block diagram of a Doppler frequency modulator which may be used in the device of FIG. 1.

FIG. 5 illustrates a preferred embodiment of the modulating means 106 in which the carrier frequency of the signal being returned to the antenna is altered by the Doppler frequency.

Referring to FIG. 5, the signal from up mixer 96 (not shown) is passed in the direction of arrow 107 into a single sideband suppressed carrier modulator 140. This modulator accepts a radio-frequency input and the Doppler frequency sine/cosine inputs to produce either the upper sideband (R.F. plus Doppler frequencies) or the lower sideband (R.F. minus Doppler frequencies). The input signals (R.F., Doppler) together with the unwanted sideband are suppressed at the output. This is accomplished by both phase and amplitude cancellations at the output.

These single sideband suppressed carrier modulators are commercially available from, e.g., Norsal Company, 850 Hofman Lane, Central Islip, N.Y.; see, for example, Norsal's part number 1233-00. The modulator is constructed using two double balanced mixers, one quadrature radio-frequency input hybrid, and one Wilkenson output combiner. The modulator is constructed with two sine/cosine input ports. By reversing these signals, the output will be the lower sideband or the upper sideband.

In modulator 140, the signal is mixed with a sine wave (transmitted through line 142) and a cosine wave (transmitted through line 144). The sine and cosine waves are produced in sine/cosine generator 146, which is controlled by velocity voltage control oscillator 148. A signal from five-line digital input means 147 is fed via line 151 to voltage control oscillator 148 and thence via line 149 to sine/cosine generator 146.

The sine and cosine waves from sine and cosine generator 146 are passed via lines 150 and 152 to a double pole double throw solid state switch 154 which applies the sine and cosine waves through lines 142 and 144. Switch 154, when energized, reverses the sine and cosine signals to produce the inbound and outbound direction of the target. In one condition, the sine wave is transmitted via line 142, and the cosine wave is transmitted via line 144. In another condition, representing the other state of switch 154, the opposite occurs.

The output signal from modulator 140 is passed via line 116 to the attenuator/radio-frequency amplifier 118 (not shown) which is illustrated in FIG. 3.

Referring again to FIG. 5, it will be seen that a command signal is fed via line 158 to switch 154.

In one embodiment, not shown, the modulator 114 may be located in either line to the mixers 66 and 72 from the local oscillator 56.

Radar PRF Bi-Phase Modulator

Figure 6:
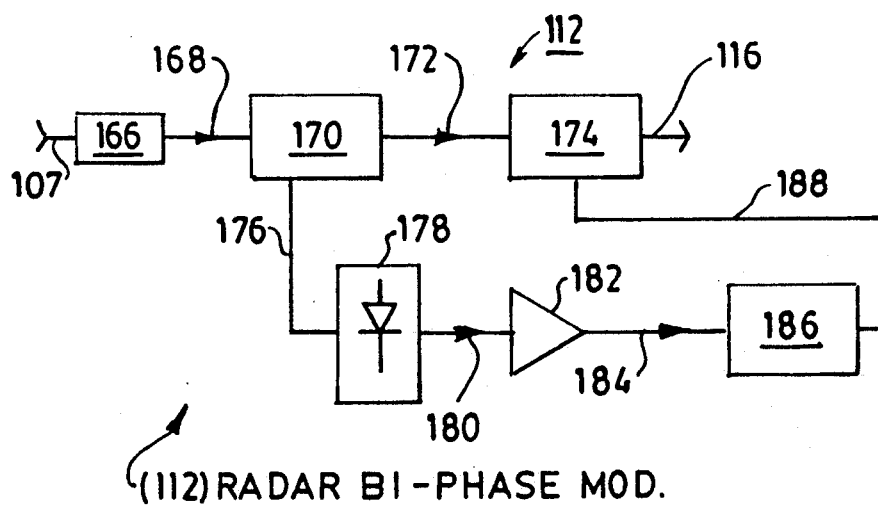
FIG. 6 is a block diagram of a radar PRF Bi-phase modulator which may be used in the device of FIG. 1.

FIG. 6 illustrates a radar Bi-phase modulator 112 which can be used in the target device of the invention. Referring to FIG. 6, it will be seen that modulator 112 is comprised of input connector 166, into which is fed the output from the up converter mixer 72. The signal from input connector 166 is then fed via line 168 to directional coupler 170, in which the signal is split into two directions. One portion of the signal is passed via line 172 to Bi-phase modulator 174; and the other portion of the signal is passed via line 176 to radio-frequency crystal detector 178.

The detected radio-frequency signal is converted to a positive video pulse in detector 178 and then passed via line 180 to video amplifier 182. The output from video amplifier 182 is fed via line 184 to a flip/flop, divide-by-two multivibrator 186, where the PRF (pulse repetition frequency) is divided by 2. The output from the multivibrator 186 is then fed via line 188 to Bi-phase modulator 174, which controls the modulation of the radio-frequency input signal applied to the modulator via line 172, thus producing on alternate pulses zero phase shift or 180 degrees phase shift.

The radar Bi-phase modulator 174 is a commercially available unit which may be purchased from Fredwal Inc. of 2211 Main Street in Buffalo, N.Y. as part number 8701-1700, "Bi-phase modulator."

The modulator used in this embodiment is well known to those skilled in the art. It has been used for many years in a device identified as "Model 8701-0100-2 'X' Band Pulse Doppler Radar Target," which is sold by the Fredwal Inc. of 2211 Main Street in Buffalo, N.Y. The device is described in a publication made in April, 1991 and entitled "Operations and Maintenance Manual for Model: 8701-0100-2 . . . "

Referring again to FIG. 6, it will be seen that the output from Bi-phase modulator 174 is fed through line 116 to amplifier/attenuator 118 (not shown in FIG. 6).

Tactical Radar Training System

Figure 7:
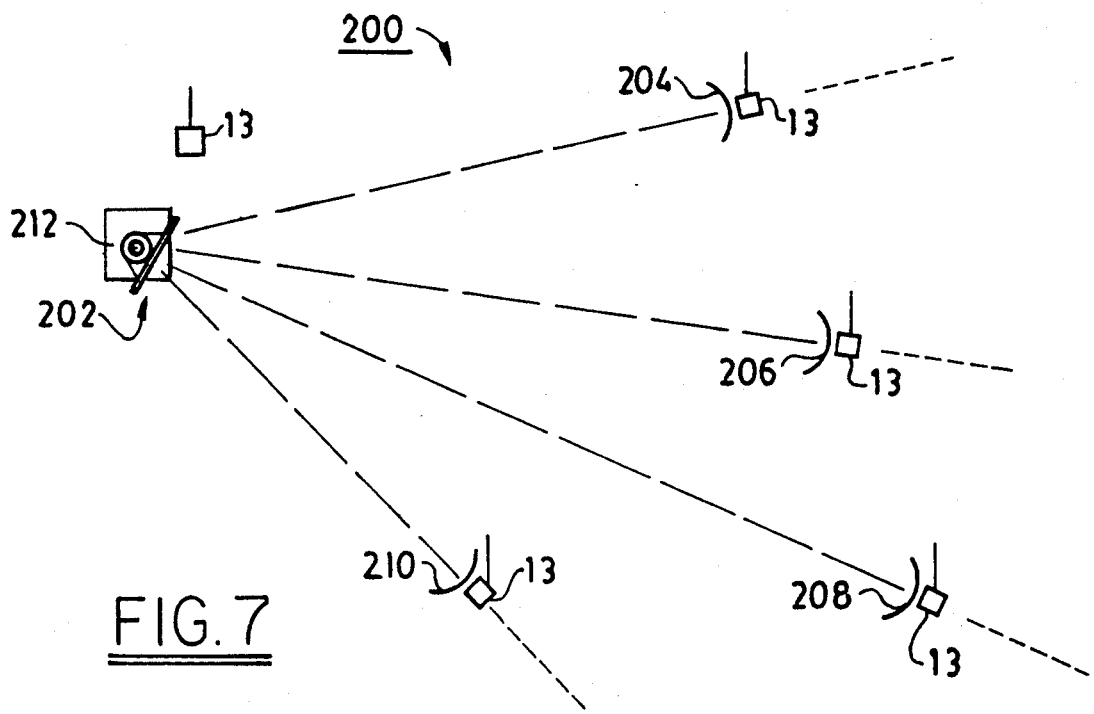
FIG. 7 is an illustration of a simulation system, which employs a multiplicity of the target devices of FIG. 1 and which can simulate the complicated motions of a multiplicity of objects which are controlled by a data link.

FIG. 7 illustrates a tactical radar training system 200 which is adapted to simulate moving objects such as, for low altitude threat aircraft. This system 200 provides a cost effective simulation system which is adapted to train radar operators without the need to fly aircraft against the radar system.

In one embodiment of system 200, the radar is adapted to simulate aircraft ranges of from about 100 microseconds (8 miles) down to about 5 microseconds (less than 0.5 mile) beyond the target location. The range of velocities that can be developed is from about 5 knots to about 500 knots, or more.

The training system 200 may be used, for example, to simulate the approach of a single high-speed, low-altitude threat aircraft. Alternatively, training system 200 may be used to simulate the approach of several aircraft approaching simultaneously. Alternatively, the system 200 can be used to simulate a slower moving helicopter.

Referring to FIG. 7, it will be seen that radar training system 200 is comprised of a high performance radar system 202 (such as, e.g., a tactical radar system), a multiplicity of the delayed radar targets 204, 206, 208, and 210 of this invention, and a remote data link 212, which allows one to select the parameters of system 200 and to alter its performance.

Data link 212 is operatively connected to targets 204, 206, 208, and 210. This data link 212 can initiate the radar targets to simulate multiple approaching threat aircraft, singly or simultaneously. Several programmed combinations of Doppler frequency and rates that the range delay will incrementally reduce are available.

The range to the targets 204 and/or 206 and/or 208 and/or 210 can be incrementally changed at a rate to coincide with the Doppler frequency (velocity) imparted to the radar carrier. The amplitude of the return can be attenuated to simulate a small aircraft, or the return can be amplified to simulate a larger aircraft.

In one embodiment, each of targets 204, 206, 208, and 210 is mounted on a high tower which is high enough to appear to the radar as an approaching low altitude helicopter or a high performance aircraft. Alternatively, the targets 204, 206, 208, and 210 may be mounted on vehicles to relocate these targets to another site for maximum training authenticity.

Each of the targets 204, 206, 208, and 210, after having been actuated by the data link 212 and illuminated by the host radar 202, will approach on a radial path, i.e., the simulated aircraft (or other moving objects) will approach the host radar at a constant azimuth angle and a constant elevation angle.

Process for using the Delayed Radar Target to limit clutter

Figure 8:
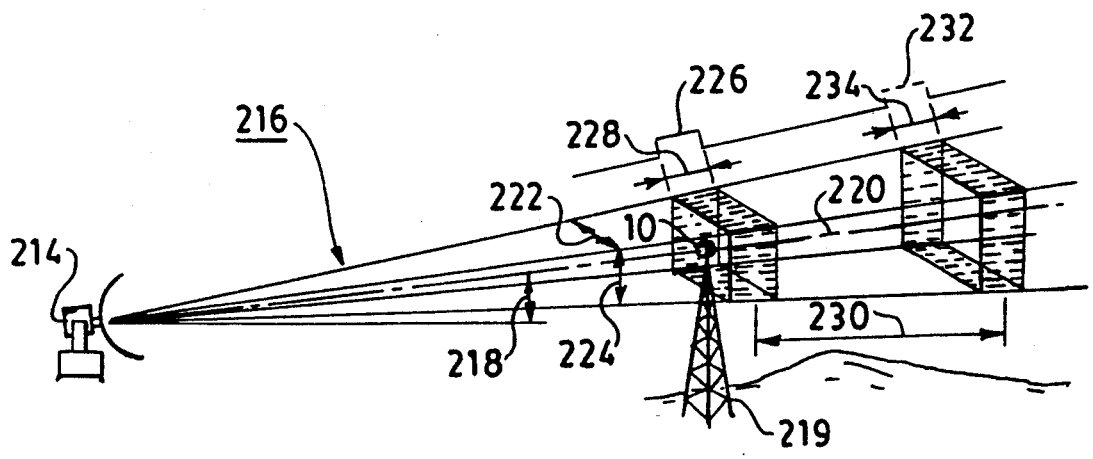
FIG. 8 is an illustration of process for utilizing the radar target depicted in FIG. 1 to generate a clutter-free radar return.

FIG. 8 illustrates a process for using applicants' delayed radar target 10 illustrating how the use of applicants' delayed radar return system provides a radar return which is free of clutter and skin return.

Referring to FIG. 8, it will seen that, in the preferred process of this invention, the target 10 is mounted on a tall object 219, such as a tower, building, or mountain top. This is done to elevate the radar beam above the radar horizon.

Host radar 214 will be adjusted so that radar beam 216 has an elevation angle 218 several degrees of elevation above the radar horizon and the beam is above the ground at the delayed range. Referring to FIG. 8, it will be seen that beam 216 is comprised of the beam center (antenna axis) 220, azimuth beamwidth 222, and elevation beamwidth 224.

Referring again to FIG. 8, it will be seen that, the radar pulse 226 received by the target 10 with a pulse width 228 is delayed by a distance 230. The return from the delayed pulse 232 is beyond the tower clutter and above the ground, thereby providing a clutter-free signal back to the radar.

System for locating an airport runway

Figure 9:
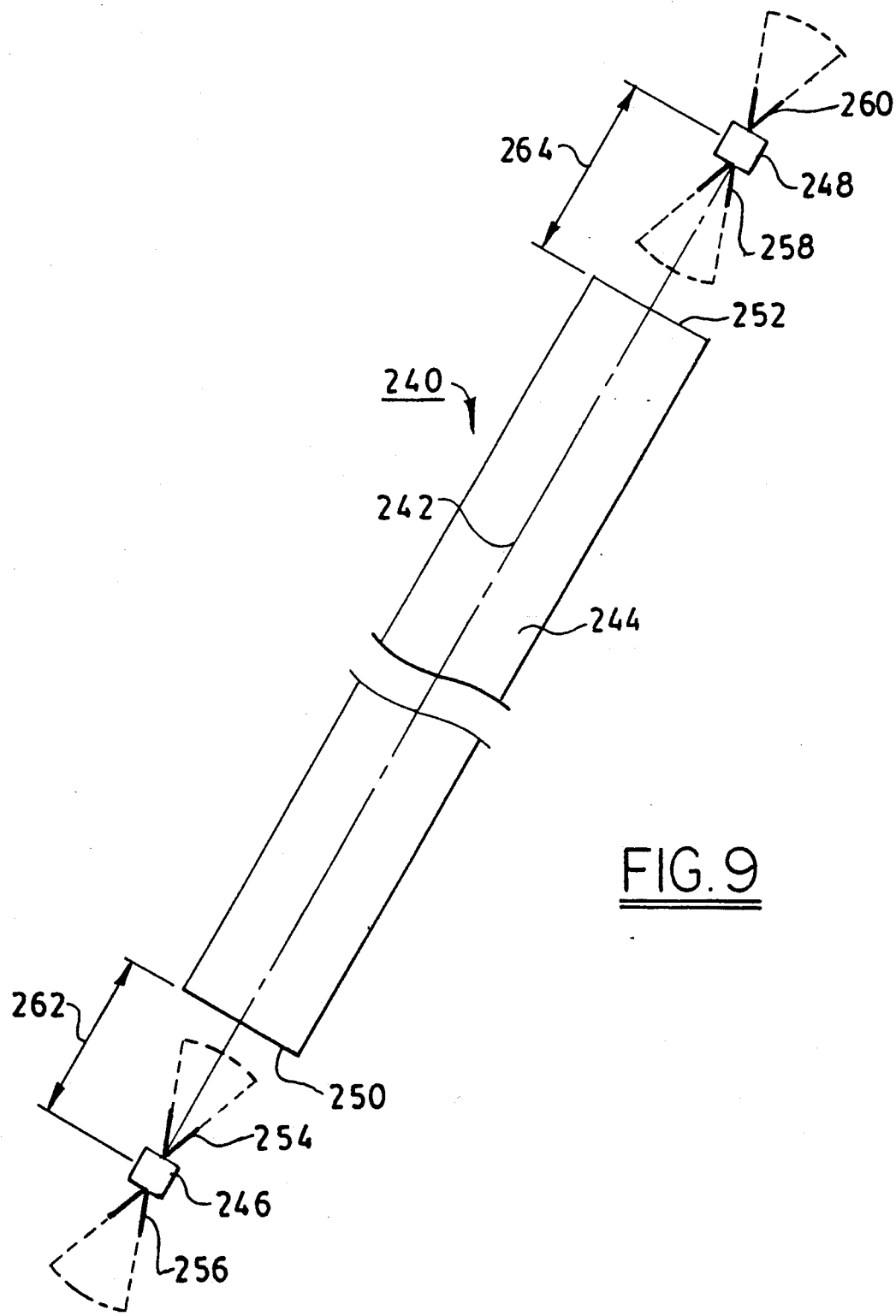
FIG. 9 is an illustration of a process for using two of the radar targets depicted in FIG. 1 to assist aircraft in locating the centerline of an unattended airport runway.

FIG. 9 illustrates a system 240 for assisting an aircraft (not shown) in locating the centerline 242 of an unattended airport runway 244. System 240 is preferably comprised of a pair of Doppler radar targets 246 and 248 placed at opposite ends 250 and 252 of runway 244.

Each of Doppler targets 246 and 248 is comprised of two horn antennas pointing in opposite directions along the centerline 242 of runway 244. Thus, target 246 is comprised of horn antennas 254 and 256; and target 248 is comprised of horn antennas 258 and 260. Targets 246 and 248 are located distances 262 and 264 from ends 250 and 252 of runway 244.

It is preferred that horn antennas 254, 256, 258, and 260 each have a wide azimuth beamwidth and a narrower elevation beamwidth. In this embodiment, it is also preferred that these horn antennas be pointed up by approximately one-half of a beamwidth. Thus, by way of illustration, the azimuth beamwidth can be about 20 degrees and the elevation beamwidth can be about 10 degrees.

The aircraft (not shown) may approach from either direction. As the aircraft approaches the area within the beamwidth, two replies would appear on its radar scope. When both replies appear lined up with the zero degree cursor, the aircraft would then be "on" the centerline. The range to the runway could be observed as the aircraft approached the runway.

Process for identifying a friendly vehicle

In one embodiment of the invention, a preferred embodiment of the target 10 of this invention may be utilized as an "IFF" (identification of friend or foe) device in order to identify a friendly vehicle or troop or other object. The preferred target 10 used in this process is equipped with a means for varying type of the delayed reply signal which is returned by the target 10.

The preferred target 10 can be located on or about a friendly vehicle, troop, or other object. Thereafter, the friendly vehicle, troop, or other object could be interrogated by radar to determine whether it was in fact friendly.

Friendly objects which returned a specified multiple pulse reply upon radar interrogation would not be attacked. Objects which returned a reply which were not identical to the specified multiple pulse reply could be attacked. The identity of the coded multiple pulse reply could be changed daily or as required.

The use of the targets 10 in this process minimizes the chances of friendly troops or objects being attacked by friendly fire.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. An apparatus for producing an electromagnetic signal, wherein said apparatus is comprised of:
    (a) means for receiving a radar signal which has a frequency of from about 1 to about 94 gigacycles;
    (b) means for decreasing the frequency of said radar signal by at least about 65 percent, thereby producing a reduced frequency electromagnetic signal with a center frequency of from about 700 to about 1,300 megacycles;
    (c) delay means for delaying said reduced frequency electromagnetic signal by at least about three radar pulse widths and from about 5 to about 100 microseconds, thereby producing a delayed electromagnetic signal, wherein:
        1. said delay means is comprised of a first delay circuit and a second delay circuit,
        2. each of said first delay circuit and said second delay circuit is substantially non-attenuating, and
        3. each of said first delay circuit and said second delay circuit is substantially non-dispersive;
    (d) means for increasing the frequency of said delayed electromagnetic signal to produce a delayed electromagnetic wave with an increased frequency which is substantially identical to the frequency of said radar signal, thereby producing a delayed radar signal with a frequency of from about 1 to about 94 gigacycles;
    (e) means for modulating said delayed radar signal with a frequency of from about 1 to about 94 gigacycles, thereby producing a modulated, delayed radar signal; and
    (f) means for transmitting said modulated, delayed radar signal.

2. The apparatus as recited in claim 1, wherein said means for decreasing the frequency of said radar signal is comprised of an oscillator.

3. The apparatus as recited in claim 2, wherein said means for decreasing the frequency of said radar signal is comprised of a double balanced mixer.

4. The apparatus as recited in claim 3, wherein each of said first delay circuit and said second delay circuit is comprised of an amplifier and a delay module.

* * * * *